US008493193B2

(12) United States Patent
Louis et al.

(10) Patent No.: US 8,493,193 B2

(45) Date of Patent: Jul. 23, 2013

(54) ANTI THEFT LOCKING SYSTEM

(76) Inventors: Jean Ramy Louis, Bend, OR (US); Milton L. Hultberg, Powell Butte, OR (US); William J. Seeber, Silverton, OR (US)

( * ) Notice: Subject to any disclaimer, the term of this patent is extended or adjusted under 35 U.S.C. 154(b) by 239 days.

(21) Appl. No.: 12/803,509

(22) Filed: Jun. 28, 2010

(65) Prior Publication Data

US 2011/0316683 A1 Dec. 29, 2011

(51) Int. Cl.
*B60R 25/10* (2006.01)

(52) U.S. Cl.
USPC ... 340/426.28; 340/5.2; 340/5.72; 340/425.5; 340/545.6; 340/545.7; 340/545.8; 340/539.1; 70/101; 70/333 A; 70/416

(58) Field of Classification Search
USPC ....................... 70/275–283, 101, 333 A, 416; 340/545.6–545.8, 539.1, 5.2, 5.72, 425.5, 340/426.28; 292/2–7, 32–43
See application file for complete search history.

(56) References Cited

U.S. PATENT DOCUMENTS

| | | | | |
|---|---|---|---|---|
| 5,640,139 | A | 6/1997 | Egeberg | |
| 5,648,763 | A | 7/1997 | Long | |
| 5,815,557 | A | 9/1998 | Larson | |
| 6,778,068 | B2 | 8/2004 | Wolfe | |
| 6,987,441 | B2 | 1/2006 | Roeland | |
| 2001/0015691 | A1* | 8/2001 | Mellen et al. | 340/5.2 |
| 2002/0121962 | A1* | 9/2002 | Wolfe | 340/5.72 |
| 2006/0117820 | A1* | 6/2006 | Lanigan et al. | 70/279.1 |
| 2006/0164235 | A1 | 7/2006 | Gounder | |
| 2006/0186730 | A1 | 8/2006 | Countermarsh et al. | |
| 2007/0044524 | A1 | 3/2007 | Countermarsh et al. | |
| 2007/0109097 | A1 | 5/2007 | Countermarsh et al. | |
| 2007/0227913 | A1 | 10/2007 | Schoenfeld | |
| 2009/0217718 | A1* | 9/2009 | Porter | 70/271 |

* cited by examiner

*Primary Examiner* — Tai T Nguyen
*Assistant Examiner* — Ojiako Nwugo
(74) *Attorney, Agent, or Firm* — Robert E. Howard

(57) ABSTRACT

An anti theft locking system for the cargo carrying portion of a truck, trailer, shipping container, and/or railcar having at least one access door. The anti theft locking mechanism and associated signal processing means for locking the access door are all located entirely within the cargo carrying portion and cannot be accessed from outside. The locking mechanism can be locked in response to a coded locking signal generated from the exterior of the cargo carrying portion. The locking mechanism can be unlocked in response to a coded unlocking signal generated from a remote location.

15 Claims, 3 Drawing Sheets

ANTI THEFT LOCKING SYSTEM

BACKGROUND OF THE INVENTION

The present invention relates to an anti theft locking system, primarily for use in the shipping industry with trucks, trailers, cargo containers and/or railcars.

Many trucks, trailers, and cargo containers have side-by-side access doors at one end thereof that are externally latched. Railcars or boxcars typically have sliding doors which come together into abutment and are externally latched. In the past such external latches have typically been secured by the use of padlocks. Since the padlocks can be easily accessed a thief can easily open the padlocks with counterfeit or stolen keys, or cause destruction of the padlock, and break into the truck, trailer, container and/or railcar.

Truck, trailer, container and/or railcar security systems have been suggested that involve locks that are activated from a remote location via satellite or cell phone. U.S. Pat. Nos. 5,640,139 and 6,987,441 are exemplary of such systems. However, the security systems described in these and other patents retain the lock and/or other components of the system on the outside of the truck, trailer or container which still allows thieves the opportunity to tamper with the security system and gain access to the contents thereof.

SUMMARY OF THE INVENTION

It is an object of this invention to provide an anti theft locking system for trucks, trailers, containers and/or railcars where none of the components of the anti theft locking system can be manually accessed from the outside thereof, and which can only be unlocked from a secure, remote location.

The anti theft locking mechanism and associated signal processing means for locking and unlocking a cargo access door (the locking mechanism and signal processing means in the aggregate being referred to herein as the "anti theft locking system") of the present invention are all located entirely within the cargo carrying portion of the truck, trailer, cargo container and/or railcar and cannot be manually accessed from outside the cargo carrying portion.

The various components of the anti theft locking system of the present invention are all located inside tamper proof sealed enclosures to eliminate tampering at dock side.

The locking mechanism of the present invention can be locked in response to a coded locking signal generated from the exterior of the cargo carrying portion.

The locking mechanism of the present invention can be unlocked in response to a coded unlocking signal generated from a location remote from the cargo carrying portion.

The anti theft locking system of the present invention is relatively lightweight, easy to install on existing trucks,. trailer, containers and/or railcars, and does not require additional infrastructure to operate at dock side.

DESCRIPTION OF PREFERRED EMBODIMENTS

Figure 1:
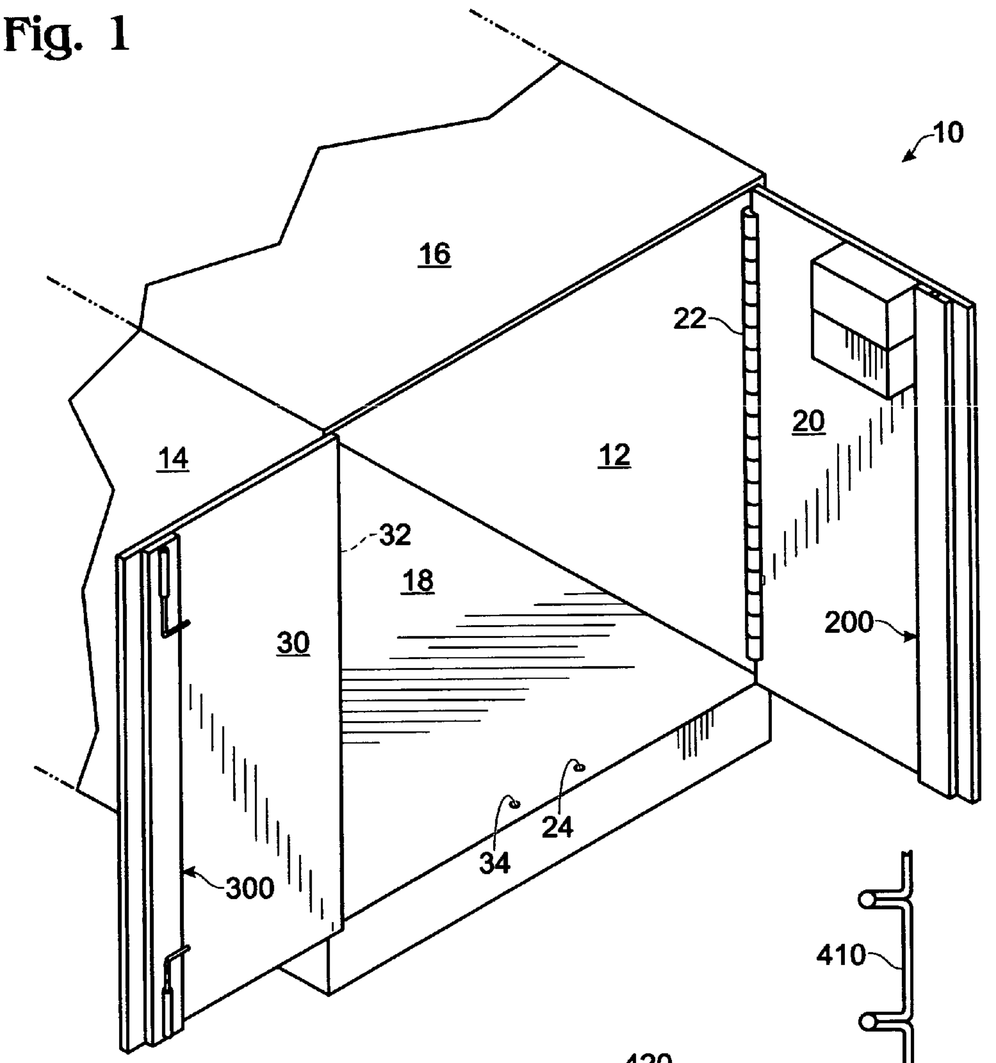
FIG. 1 is a perspective view of the loading end of a truck, trailer or container showing the right and left access doors, the main locking panel for the right door, and the locking panel for the left door.
Figure 6:
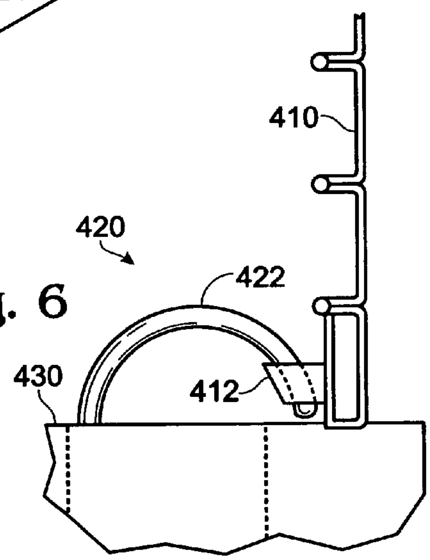
FIG. 6 is an enlarged side elevation view of that portion of FIG. 5 located within circle 6.

Reference number 10 represents the cargo carrying portion of a truck, trailer or cargo container having side walls 12 and 14, a roof 16, and a floor 18. The loading end of truck, trailer or container 10 has right and left access doors 20 and 30, respectively. The closed end of truck, trailer or container 10 located opposite the loading end is not shown.

Right and left access doors 20 and 30 are attached along their vertical inner edges to the ends of right and left side walls 12 and 14 by vertical hinges 22 and 32 in a manner well known in the truck, trailer and container art.

Figure 2:
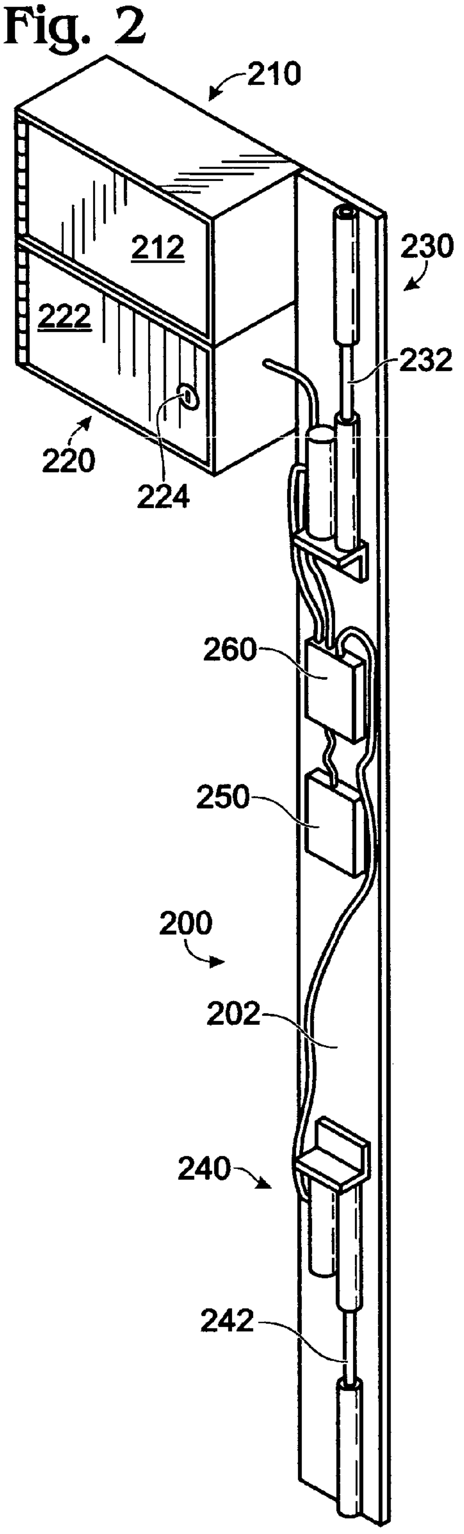
FIG. 2 is a perspective view of the main locking panel for the right access door of a truck, trailer or container.
Figure 3:
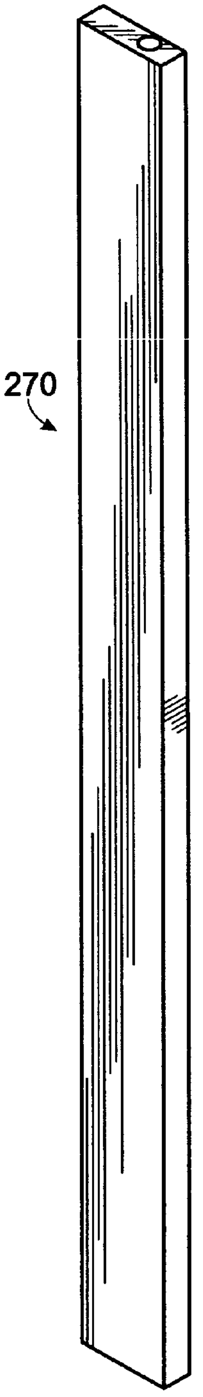
FIG. 3 is a perspective view of the main locking panel cover.
Figure 4:
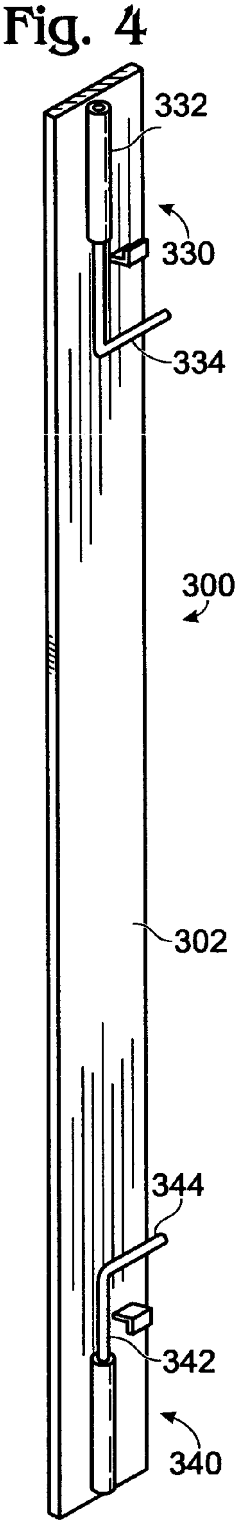
FIG. 4 is a perspective view of the locking panel for the left door.

As best seen in FIGS. 1 and 2, a right door main locking panel 200 includes a flat steel plate 202 and upper and lower steel boxes 210 and 220.

Steel plate 202 is attached to right access door 20 adjacent its outer vertical edge, as shown in FIG. 1. Attachment is effected in a manner adapted to render removal of steel plate 202 from right access door 20 difficult, such as attaching by welding steel plate 202 to the frame of right access door 20.

Upper and lower steel boxes 210 and 220 are located vertically adjacent each other and are attached to the upper end of steel plate 202 and/or right access door 20 adjacent its upper edge. Attachment is effected in a manner adapted to render removal of upper and lower steel boxes 210, 220 difficult, such as attachment by welding.

Steel boxes 210 and 220 have hinged lids 212 and 222, respectively, to allow access to the interiors thereof. Hinged lid 222 has a keyhole 224 to allow access to a keyed lock, not shown, to allow it to be locked shut. Locking hinged lid 222 can overlap hinged lid 212 so that it cannot be opened without first opening hinged lid 222. Upper steel box 210 is adapted to hold an antenna (not shown) and lower steel box 220 is adapted to hold a battery (preferably 12 volt, not shown).

Alternatively, upper and lower steel boxes 210 and 220 could be combined into a single steel box with a locking door. Whether individual steel boxes 210 and 220 are used, or an alternative single steel box (not shown), they provide a tamper proof enclosure for the components contained therein.

An upper locking mechanism 230 is attached to the upper end of steel plate 202 and a lower locking mechanism 240 is attached to the lower end of steel plate 202. Upper and lower locking mechanisms 230 and 240 can be of any type that is electric motor driven to vertically extend and retract an upper locking bolt 232 and a lower locking bolt 242. A suitable upper and lower locking mechanism 230, 240 can be a screw jack driven by an electric motor. Upper locking bolt 232 is adapted to be extended into, and retracted from, a cylindrical opening (not shown) located in the roof 16 of trailer or container 10 that is in alignment with upper locking bolt 232 when right access door 20 is fully closed. Similarly, lower locking bolt 242 is adapted to be extended into, and retracted from, a cylindrical opening 24 located in the floor 18 of trailer or container 10 that is in alignment with lower locking bolt 242 when right access door 20 is fully closed.

A transceiver 250 is attached to steel plate 202 in a mid-portion thereof. Transceiver 250 is preferably a satellite and/or cell phone communications transceiver of the type well known in the art and adapted to communicate through a satellite or cell phone 252 with a remotely located control center 254. Transceiver 250 can, optionally, also be adapted to receive location information from a GPS satellite system 256.

A controller 260 is attached to steel plate 202 in a mid-portion thereof. The controller 260 is a microprocessor having memory for data storage, is capable of receiving inputs from one or more of the components of the anti theft locking system of the present invention, and capable of providing output signals capable of controlling one or more of the components of the system. Controller 260 is electrically coupled to transceiver 250 and to upper and lower locking mechanisms 230 and 240, respectively. All of these components are electrically coupled to the battery located in steel box 220.

A cover 270 is positioned over steel plate 202 and the components attached to the upper surface thereof. Cover 270 is attached to steel plate 202 in a manner adapted to provide a tamper proof enclosure for upper and lower locking mechanisms 230, 240, transceiver 250, and controller 260.

Left access door 30 has a manual locking mechanism 300 that includes left steel plate 302, upper manual lock 330 and lower manual lock 340. Upper lock 330 includes an upper slide bolt 332 with handle 334, and lower lock 340 includes a lower slide bolt 342 with handle 344.

The left access door 30 locking mechanism 300 is located entirely within the trailer or container 10 when left access door 30 is shut and locked.

In operation, after the trailer or container 10 has been loaded, the left access door 30 is closed. Upper manual lock 330 is locked by inserting slide bolt 332 into a socket (not shown) in the ceiling 16 and lower manual lock 340 is locked by inserting slide bolt 342 into a socket 34 located in the floor 18 of trailer or container 10.

Right access door 20 is then closed and upper and lower locks 230 and 240 lockingly engaged in response to a coded locking signal sent by a fob 258 carried by the driver or other authorized person which is received by transceiver 250 and transmitted to upper and lower locks 230 and 240 by the controller 260. Alternatively, the coded locking signal could be sent from the remote control center 254 to transceiver 250 via satellite or cell phone 252.

During transit GPS unit 256 can transmit location information to control center 254 via transceiver 250 and satellite or cell phone 252 in a manner well known in the shipping art.

Once the trailer or container 10 has arrived at its destination, upper and lower locks 230 and 240 are disengaged to allow access to the interior of the trailer or container 10. This is accomplished by the truck driver or other authorized person who notifies control center 254 of the trucks arrival at its intended destination and requests that the locks be disengaged. Control center 254 can verify the location of trailer or container 10 by means of the GPS unit 256. Control center 254 then sends a coded signal to transceiver 250 via satellite or cell phone 252 which causes a lock disengagement signal to be sent by transceiver 250 to upper and lower locks 230 and 240 via controller 260.

It is clear that the anti theft locking system described above relative to the embodiment shown in FIGS. 1-4 and 7 can also be used with railcar doors which are located in a mid-portion of the railcar and whose inner vertical edges abut when in the closed position.

Figure 5:
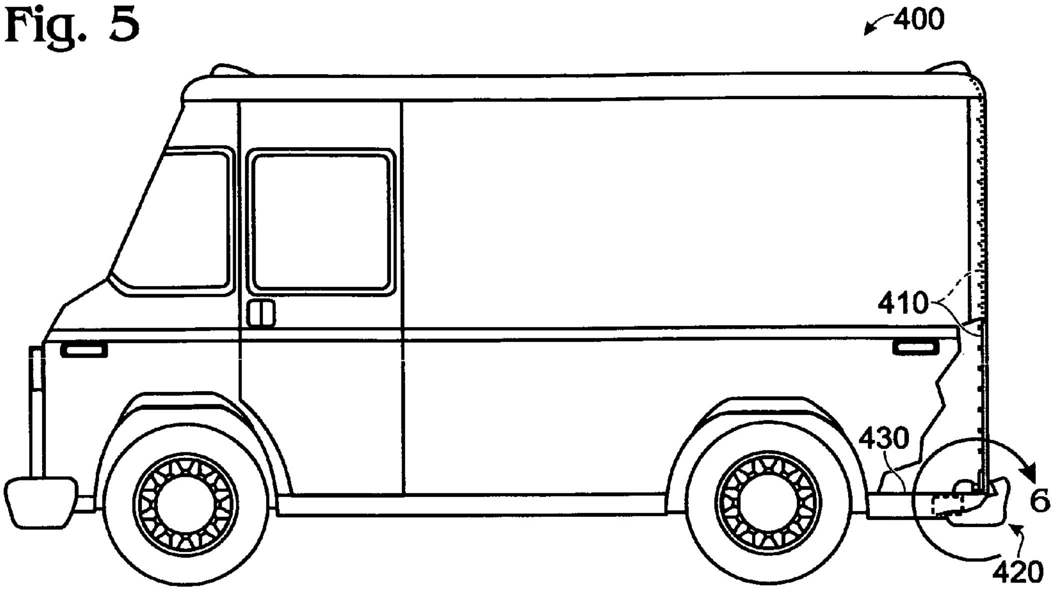
FIG. 5 is a side elevation view of a vehicle having a roll-up type access door, partially in section.

The anti theft locking system of the present invention can also be used with trucks, trailers or containers having a roll-up type access door. A truck 400 is shown in FIG. 5 having a roll-up type door 410. An anti theft locking mechanism 420 is concealed within a steel box below floor 430 and just inside the roll-up door . Locking mechanism 420 includes a pivoting hook 422 which can be pivoted from its location below floor 430 through a slot (not shown) in floor 430 and into locking engagement with a lock bar 412 attached to the lower edge of door 410. Lock bar 412 together with anti theft locking mechanism 420 could be located in a mid-portion of the lower edge of door 410, or identical lock bars 412 and associated identical anti theft locking mechanisms 420 could be located on the right and left sides of the lower edge of door 410.

Figure 7:
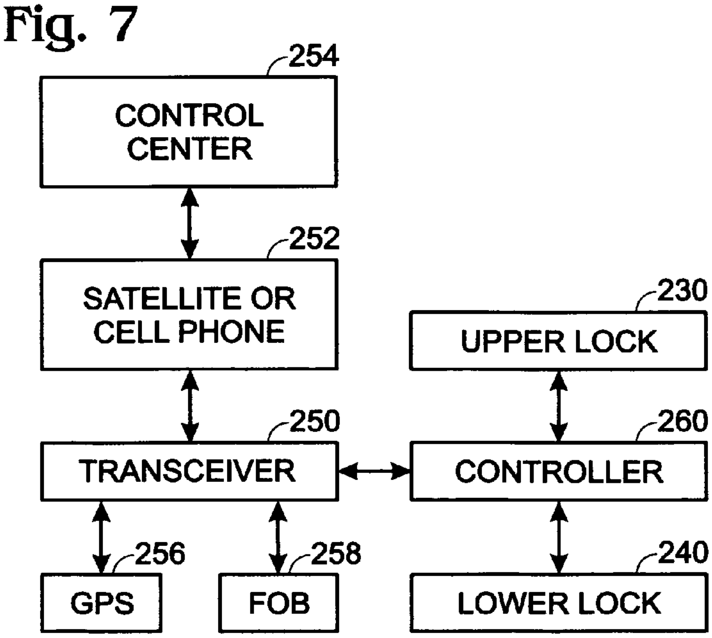
FIG. 7 is a block diagram of the locking system components of FIGS. 1-6.

All of the components shown in the block diagram of FIG. 7 would apply to the roll-up type door anti theft system with the exception that where there are right and left locking mechanisms 420 "upper lock" 230 would become "right lock" and "lower lock" 240 would become "left lock", and where there is only one locking mechanism 420 one of upper lock 230 or lower lock 240 would be eliminated.

It will be obvious to those having skill in the art that many changes may be made to the details of the above-described embodiments of this invention without departing from the underlying principles thereof. The scope of the present invention should, therefore, be determined only by the following claims.

The invention claimed is:

1. An anti theft locking system for the cargo carrying portion of a truck, trailer or shipping container, said cargo carrying portion having right and left side walls, a ceiling, a floor, and including at least one access door, comprising:

a signal actuated locking mechanism in electrical communication with signal transceiving and processing means, said signal actuated locking mechanism and said signal transceiving and processing means being located in a manually inaccessible location;

said signal actuated locking mechanism adapted to lock said access door in response to a coded locking signal generated from the exterior of said cargo carrying portion and received and processed by said signal transceiving and processing means;

said signal actuated locking mechanism adapted to unlock said access door in response to a coded unlocking signal generated from a remote location and received and processed by said signal transceiving and processing means;

said cargo carrying portion including left and right access doors movable from an open position allowing access to said cargo carrying portion to a closed position denying access to said cargo carrying portion, one of said left and right access doors having upper and lower manual locking means, the other of said left and right access doors supporting said signal actuated locking mechanism, said signal actuated locking mechanism including upper and lower signal actuated locking means actuated by said coded locking and unlocking signals, each of said manual locking means and signal actuated locking means being located entirely within said cargo carrying portion when said left and right access doors are in their closed position and no part thereof can be manually accessed from outside said cargo carrying portion; and a steel base plate attached to said other of said left and right access doors along its outer vertical edge, said steel base plate containing said locking mechanism and associated signal receiving and processing means on its outer surface, and a cover attached to said steel base plate to provide a tamper proof enclosure for said locking mechanism and associated signal receiving and processing means.

2. The anti theft locking system of claim 1 wherein said upper and lower manual locking means are slide bolts movable vertically from a retracted, unlocked position to an extended, locked position and which engage receptacles located in said ceiling and floor, respectively, when in said extended position.

3. The anti theft locking system of claim 1 wherein each of said upper and lower signal actuated locking means are upper and lower locking bolts movable from a retracted, unlocked position to an extended, locked position, and means for moving each of said locking bolts.

4. The anti theft locking system of claim 3 wherein said upper and lower locking bolts are vertically movable between said retracted position and said extended position.

5. The anti theft locking system of claim 4 wherein receptacles are located in said ceiling and said floor which are adapted to receive said upper locking bolt in its extended position and said lower locking bolt in its extended position, respectively, in locking engagement.

6. The anti theft locking system of claim 3 wherein said means for moving said locking bolts are electrically driven screw jacks.

7. The anti theft locking system of claim 1 including at least one steel box attached to said steel base plate and/or said other of said left and right access doors, and adapted to provide a tamper proof enclosure for a battery, said battery being in electrical communication with said upper and lower signal actuated locking means and said signal transceiving and processing means.

8. An anti theft locking system for the cargo carrying portion of a truck, trailer or shipping container, said cargo carrying portion having right and left side walls, a ceiling, a floor, and left and right access doors movable from an open position allowing access to said cargo carrying portion to a closed position denying access to said cargo carrying portion, comprising:

one of said left and right access doors having upper and lower manual locking means located within said cargo carrying portion;

the other of said left and right access doors having upper and lower signal actuated locking means in electrical communication with signal transceiving and processing means;

said upper and lower signal actuated locking means and associated signal transceiving and processing means being located entirely within said cargo carrying portion when said left and right access doors are in their closed position and no part thereof can be manually accessed from outside said cargo carrying portion;

said signal actuated locking mechanism adapted to lock said access door in response to a coded locking signal generated from the exterior of said cargo carrying portion and received and processed by said signal transceiving and processing means;

said signal actuated locking mechanism adapted to unlock said access door in response to a coded unlocking signal generated from a remote location and received and processed by said signal transceiving and processing means; and a steel base plate attached to said other of said left and right access doors along its outer vertical edge, said steel base plate containing said locking mechanism and associated signal receiving and processing means on its outer surface, and a cover attached to said steel base plate to provide a tamper proof enclosure for said locking mechanism and associated signal receiving and processing means.

9. The anti theft locking system of claim 8 wherein said upper and lower manual locking means are slide bolts movable vertically from a retracted, unlocked position to an extended, locked position and which engage receptacles located in said ceiling and floor, respectively, when in said extended position.

10. The anti theft locking system of claim 8 wherein each of said upper and lower signal actuated locking means are upper and lower locking bolts movable from a retracted, unlocked position to an extended, locked position, and means for moving each of said locking bolts.

11. The anti theft locking system of claim 10 wherein said upper and lower locking bolts are vertically movable between said retracted position and said extended position.

12. The anti theft locking system of claim 11 wherein receptacles are located in said ceiling and said floor which are adapted to receive said upper locking bolt in its extended position and said lower locking bolt in its extended position, respectively, in locking engagement.

13. The anti theft locking system of claim 10 wherein said means for moving said locking bolts are electrically driven screw jacks.

14. The anti theft locking system of claim 8 including at least one steel box attached to said steel base plate and/or said other of said left and right access doors, and adapted to provide a tamper proof enclosure for a battery, said battery being in electrical communication with said upper and lower signal actuated locking means and said signal transceiving and processing means.

15. The anti theft locking system of claim 8 including a GPS unit adapted to transmit a location signal to a remote control center.

* * * * *